UNITED STATES PATENT OFFICE.

SAMUEL W. OSGOOD, OF CHICAGO, ILLINOIS.

PROCESS FOR TREATING MINERAL SUBSTANCES.

1,169,506.   Specification of Letters Patent.   Patented Jan. 25, 1916.

No Drawing.   Application filed June 22, 1914.  Serial No. 846,439.

*To all whom it may concern:*

Be it known that I, SAMUEL W. OSGOOD, a citizen of the United States, residing at Chicago, in the county of Cook and State of Illinois, have invented certain new and useful Improvements in Processes for Treating Mineral Substances, of which the following is a specification.

My invention relates to an improved process for the manipulation of mineral matter such as is found in the refuse or slag resulting from blast furnace operation, and consists in bringing small particles or pebbles of the material to be treated while in highly heated condition into contact with more easily fusible silicate, and in further treating the particles either with other fusible salts of a hardening nature or with coloring material, or both, as desired.

My process may be used in connection with any material of substantially the nature and chemical composition of blast furnace slag, which consists largely of silica with a greater or less percentage of calcium oxid and other relatively refractory oxids.

In carrying out my process the slag may be broken up into small particles or pebbles in any desired manner, although I find it preferable, for the sake of simplicity and cheapness, to accomplish this breaking up by running the molten slag from the furnace directly into or through water which has the effect, as a result of the sudden cooling action, of solidifying and simultaneously cracking the slag so as to break it up into small particles or pebbles. I do not claim this operation *per se* as my invention, but when combined with the other steps to be described, my process consists of novel steps and operations which result in the production of a product not heretofore available. The particles or pebbles resulting from the breaking up of the slag by the action of water in the manner referred to are relatively soft and friable, as a result of which these pebbles or particles cannot be used in the arts in connections in which it is necessary that mineral particles shall possess considerable hardness. To modify these particles or pebbles so that they shall be denser and sufficiently hard to use in various ways, as, for example, for coating roofing material, I dissolve in the water into or through which the molten slag is passed a soluble silicate, such, for example, as sodium silicate or potassium silicate, and the effect of this silicate solution upon the slag is to break it up into small particles or pebbles, as where the water alone is used, with the added result, however, that a sufficient amount of the silicate is appropriated from the solution by each pebble or particle to fill the interstices or pores wholly or in part and coat the particle or pebble with a partial or complete covering or envelop of the silicate. As a result of this process, which I believe is broadly new, the mineral particles produced are relatively hard or dense, and may be used for decorative purposes generally, or for roofing material. For certain purposes, as, for example, in preparing roofing material where crushed material is embedded forcibly into the surface of tar paper so as to give the paper a protective covering of decorative material, it is desirable to impart even greater hardness to the particles or pebbles, and this is accomplished by my improved process by treating the pebbles or particles with a solution containing a hardening salt, such, for example, as silicate or sulfate of aluminum, calcium, or magnesium. This portion of my process may be accomplished by heating the previously treated particles or pellets with a solution containing the hardening silicate or salt by first heating the particles so that the coating of silicate previously applied, which is readily fusible compared with the remaining portion of the particles or pellets, is softened, and then immersing them in the solution containing the hardening salt. This causes a sufficient amount of the hardening salt to be incorporated with the coating of the particles or pebbles to impart a decided hardening effect to the same.

It will be understood that the salts employed for hardening the resulting product need not necessarily be made into true solutions, as these salts may be introduced into the water in finely-divided condition at substantially the time that the slag is run into the water, and thus the hardening salts are available for intimate association with the slag as soon as it is acted upon by the water and the silicate contained therein. By the term "hardening salt" as here used I mean any chemical salt which has the effect of imparting hardness to the resulting particles or pellets which are formed by the action of the water upon the slag. This hardening action may result either from the chemical reaction of the hardening salt with the hot slag or by the formation of a coating of the hardening salt upon the particles or pellets of the slag, and thus while the effect of the hardening salt upon the pellets or globules is to make them harder than they would be if the salt were not present in the water, it will be understood that this hardening salt is not necessarily itself a hard substance. In practice I have found that introducing a mixture of lime and water and alum and water into the silicate solution immediately before running the slag into said solution has a marked hardening effect upon the pellets or globules, which would not be secured if the slag were run into the silicate solution without the presence of a hardening salt. It is unnecessary to accomplish this hardening operation as a separate step of my process, for the hardening salt may be placed directly in the original silicate solution and the silicate and hardening salt will be applied during the first step in the treatment of the slag by which the slag is broken up into the particles or pellets. For many purposes it is desirable to impart distinctive colors to the particles or pellets, and this I find may readily be done by treating the particles with powdered mineral color, such, for example, as chromic oxid when a green color is desired, or other coloring matter when other colors are desired, and this treatment may be effected in a variety of ways, as, for example, the powered color may be applied to the particles either before or after the hardening, and the color may be fixed by heating the particles to sufficiently soften the silicate coating to absorb the color; or the powdered color may be mixed in the hardening solution, or, if preferred, in the original silicate solution, and by maintaining the color in suspension by proper agitation of the solution the color will be absorbed by the silicate coating of the particles or pebbles so as to give the same the desired effect. It will be understood that the coloring operation may be accomplished simultaneously with the original coating treatment, and also at the same time as the hardening treatment, if desired.

From the above description it will be understood that by my process the resulting mineral particles or pebbles may be produced in colored form either with or without a hardening operation in the process, and that the coating and coloring may be accomplished either in a single step of the process or in successive steps as desired. Furthermore, it will be understood that the hardening of the particles or pellets may be accomplished either with or without the coloring of the same, and that the hardening may be accomplished in the same step as the coating of the particles or pellets or as a successive step in the process, as desired; and, furthermore, that the product resulting from my process is available for use for a variety of purposes in the arts whether hardened or colored, and that the particular use to which the pellets or particles are put will determine the desirability of either hardening or coloring the particles or pellets, or subjecting them to both of these operations.

The product resulting from my process is useful in many ways as a decorative material where crushed colored material is employed, as, for example, in decorative wall effects, and the material is also valuable for use as a covering for roofing paper or shingles where the roofing material is provided with a coating of more or less finely divided mineral matter secured to the surface of the roofing material either by cement, tar, or similar adhesive, or by being pressed forcibly into the surface of the roofing material. The manner in which the mineral material is used in connection with the roofing material will, of course, determine how hard the mineral matter must be for the particular purpose intended, and in connection with such roofing material there is frequently a demand for various colored effects which peculiarly adapts my product to this purpose.

The granulating effect of the water upon the molten slag above referred to is sufficient to reduce a large percentage of the slag to the finely divided condition which is required, and the resulting pebbles or particles may be properly graded by passing the material through screens of suitable mesh. Any particles or pebbles which may be too large for use for any particular intended purpose may, of course, be crushed mechanically, and after being properly graded by means of the screens, may be added to the particles originally produced by the granulating operation.

While I have described my process as carried out in the particular manner described above, I do not, however, limit myself to any specific manner of accomplishing the same, as I may employ a wide variety of chemicals to secure the intended results, and I consider that my invention covers broadly all processes of manipulation substantially equivalent to the treatment described above by which mineral matter, such as slag, may be treated to produce a product the equivalent of the resulting product specifically referred to above.

While I have described my process as capable of operation with slag, it will be understood that I contemplate treating other mineral particles or granules in the same manner, as, for example, broken or crushed rock or shale, since by so doing by taking the rock of the proper color the amount of coloring subsequently required to produce desired decorative effects may be materially reduced, or, in some cases, entirely eliminated.

In the claims I have used the term "salt" in its broad sense, meaning thereby any chemical combination of a base which within the knowledge of the art will accomplish the results indicated above.

What I claim is:

1. The process of treating mineral matter, consisting in bringing highly heated mineral matter into contact with a fusible silicate in finely-divided condition, thereby separating said mineral matter into granules, and combining the granules and silicate by the heat contained in the granules in divided condition.

2. The process of treating granulated mineral matter, consisting in coating the granules with a comparatively fusible silicate, treating the silicate with coloring matter and maintaining the granules in divided condition.

3. The process of treating mineral matter, consisting in bringing highly heated mineral matter into contact with a fusible silicate in finely-divided condition, thereby separating said mineral matter into granules, and combining the granules and silicate and a finely-divided hardening salt by the heat contained in the granules in divided condition.

4. The process of treating granulated mineral matter, consisting in coating the granules with a comparatively fusible silicate, treating the silicate with coloring matter, hardening the coating of silicate by the addition of a hardening chemical salt and maintaining the granules in divided condition.

5. The process of treating mineral granules, which consists in immersing the highly heated granules in a solution of a comparatively fusible silicate.

6. The process of treating mineral granules, which consists in immersing the highly heated granules in a solution of relatively fusible silicate and hardening chemical salt.

7. The process of treating mineral granules, which consists in immersing the highly heated granules in a solution of silicate containing coloring matter.

8. The process of treating mineral granules, which consists in immersing the highly heated granules in a solution of relatively fusible silicate and hardening chemical salt containing coloring matter.

9. The process of treating mineral granules, which consists in immersing the highly heated granules in a silicate solution, subsequently heating the treated granules, and incorporating in the coating of silicate coloring matter.

10. The process of treating mineral granules, which consists in immersing highly heated granules in a solution of relatively fusible silicate, heating the treated granules and incorporating in the silicate coating a hardening chemical salt.

11. The process of treating mineral granules, which consists in immersing highly heated granules in a solution of relatively fusible silicate, heating the treated granules and incorporating in the silicate coating a hardening chemical salt and then heating the granules and incorporating in the coating of silicate coloring material.

12. The process of making hard mineral granules from slag, consisting in running molten slag into a solution of relatively fusible silicate.

13. The process of making hard mineral granules from slag, consisting in running molten slag into a solution of relatively fusible silicate containing in suspension powdered mineral coloring matter.

14. The process of making hard mineral granules from slag, consisting in running molten slag into a solution of relatively fusible silicate containing a hardening chemical salt.

15. The process of making hard mineral granules from slag, consisting in running molten slag into a solution of relatively fusible silicate containing in suspension powdered mineral coloring matter and a soluble hardening chemical salt.

16. A manufactured mineral product, comprising granulated mineral matter having its particles separate from each other and coated with a fusible silicate.

17. A manufactured mineral product, comprising granulated mineral matter having its particles in divided condition and coated with a fusible silicate, and coloring matter in said coating of silicate.

18. A manufactured mineral product, comprising granulated mineral matter having its particles separate from each other and coated with a fusible silicate, and a hardening salt in said coating of silicate.

19. A manufactured mineral product, comprising granulated mineral matter having its particles in divided condition and coated with a fusible silicate, and a hardening salt and coloring matter in said coating of silicate.

20. A manufactured mineral product, comprising granulated slag having its granules separate from each other and coated with a fusible silicate.

21. A manufactured mineral product, comprising granulated slag having its granules separate from each other and coated with a fusible silicate containing finely divided coloring material.

22. A manufactured mineral product, comprising granulated slag having its granules separate from each other and coated with a fusible silicate and a hardening chemical salt.

23. A manufactured mineral product, comprising granulated slag having its granules separate from each other and coated with a mixture of fusible silicate, a hardening chemical salt, and coloring matter.

24. The process of treating mineral matter, consisting in granulating highly-heated mineral matter and combining the granules with a finely-divided hardening salt by the heat contained in the granules, and maintaining the granules in divided condition.

In witness whereof, I hereunto subscribe my name this 17th day of June, A. D., 1914.

SAMUEL W. OSGOOD.

Witnesses:
A. J. JEWELL,
ALBERT C. BELL.